(12) United States Patent
Lee et al.

(10) Patent No.: US 10,562,710 B2
(45) Date of Patent: Feb. 18, 2020

(54) METHOD FOR CONTROLLING VARIABLE PRODUCTION LINE USING SKID-TYPE VARIABLE WORKBENCH AND APPARATUS USING THE SAME

(71) Applicant: ELECTRONICS AND TELECOMMUNICATIONS RESEARCH INSTITUTE, Daejeon (KR)

(72) Inventors: Yong-Kwi Lee, Daejeon (KR); Hyun-Jong Kim, Cheongju-si (KR); Young-Ae Jeon, Sejong-si (KR); Hyun Kim, Daejeon (KR); Ji-Yeon Son, Daejeon (KR); Hark-Jin Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 283 days.

(21) Appl. No.: 15/822,370

(22) Filed: Nov. 27, 2017

(65) Prior Publication Data
US 2018/0155130 A1    Jun. 7, 2018

(30) Foreign Application Priority Data

Dec. 6, 2016   (KR) .......................... 10-2016-0165340
Nov. 6, 2017   (KR) .......................... 10-2017-0146561

(51) Int. Cl.
*B65G 17/32*    (2006.01)
*B65G 47/46*    (2006.01)
(Continued)

(52) U.S. Cl.
CPC ............. *B65G 17/323* (2013.01); *B25H 1/02* (2013.01); *B65G 17/005* (2013.01); *B65G 17/42* (2013.01);
(Continued)

(58) Field of Classification Search
CPC .... B65G 17/42; B65G 17/323; B65G 17/005; B65G 2201/02; B65G 47/22; B65G 47/24;
(Continued)

(56) References Cited

U.S. PATENT DOCUMENTS 4,519,491 A  *  5/1985  Prodel .................. B23Q 7/1452
                                              104/165
4,863,223 A  *  9/1989  Weissenbach ........... H02B 1/04
                                              312/209
(Continued)

FOREIGN PATENT DOCUMENTS

KR   10-2007-0041820 A   4/2007
KR   10-2007-0055251 A   5/2007
(Continued)

*Primary Examiner* — James R Bidwell
(74) *Attorney, Agent, or Firm* — LRK Patent Law Firm

(57) ABSTRACT

A method for controlling a variable production line using a skid-type variable workbench and an apparatus for the same. According to the method, a process group including multiple variable workbenches may be organized based on a design, each of the multiple variable workbenches may be mounted on an upper part of a skid board, the skid board may be loaded on a powered line that moves at a regular speed in a fixed direction, the skid board may be moved in consideration of a position of a worker responsible for each process and a work state of the process group, and movement of a target variable workbench may be stopped by removing a skid board, on which the target variable workbench corresponding to an unload instruction in the process group is
(Continued)

mounted, from the powered line when the unload instruction is input by a worker.

16 Claims, 12 Drawing Sheets

(51) Int. Cl.
  *B65G 17/42* (2006.01)
  *B25H 1/02* (2006.01)
  *G05B 19/418* (2006.01)
  *B65G 17/00* (2006.01)
(52) U.S. Cl.
  CPC ......... *B65G 47/46* (2013.01); *G05B 19/4189* (2013.01); *B65G 2201/02* (2013.01)
(58) Field of Classification Search
  CPC .... B65G 47/26; B65G 47/8815; B65G 47/46; B65H 5/066; B65H 2404/154; B65H 2511/232; B65H 2701/111; G05B 19/4189; B25H 1/02
  USPC ............. 198/346.1, 465.2, 580; 193/35 MD
  See application file for complete search history.

(56) References Cited

U.S. PATENT DOCUMENTS

| | | | | |
|---|---|---|---|---|
| 7,032,739 | B2* | 4/2006 | Tanaka | H01L 21/67727 |
| | | | | 198/465.1 |
| 8,020,284 | B2* | 9/2011 | Lee | H04M 1/24 |
| | | | | 198/346.1 |
| 8,424,672 | B2* | 4/2013 | Kim | B62D 65/18 |
| | | | | 198/346.1 |
| 9,902,568 | B2* | 2/2018 | Lee | B65G 47/53 |
| 2004/0134755 | A1* | 7/2004 | Sticht | B65G 35/06 |
| | | | | 198/465.2 |
| 2006/0090332 | A1* | 5/2006 | Taban | G06K 13/07 |
| | | | | 29/748 |
| 2010/0098573 | A1* | 4/2010 | Fan | F27B 21/00 |
| | | | | 419/1 |
| 2013/0193983 | A1 | 8/2013 | Yeo | |
| 2015/0053529 | A1* | 2/2015 | Maseki | B23Q 3/00 |
| | | | | 198/346.1 |

FOREIGN PATENT DOCUMENTS

| | | |
|---|---|---|
| KR | 10-1221411 B1 | 1/2013 |
| KR | 10-2016-0110629 A | 9/2016 |

* cited by examiner

METHOD FOR CONTROLLING VARIABLE PRODUCTION LINE USING SKID-TYPE VARIABLE WORKBENCH AND APPARATUS USING THE SAME

CROSS REFERENCE TO RELATED APPLICATIONS

This application claims the benefit of Korean Patent Applications No. 10-2016-0165340, filed Dec. 6, 2016, and No. 10-2017-0146561, filed Nov. 6, 2017, which are hereby incorporated by reference in their entirety into this application.

BACKGROUND OF THE INVENTION

1. Technical Field

The present invention relates generally to technology for controlling a variable production line using a skid-type variable workbench, and more particularly to a method in which different parts that are necessary for mixed model production are provided merely by changing a combination of skid-type variable workbenches, whereby the time and expense taken to change jigs for multiple models and workbenches suitable therefor in a production line may be reduced.

2. Description of Related Art

There are various ways to convey a workpiece along an assembly line in a factory. Among them, a method of conveying a workpiece between working processes using a conveyor belt and a method of placing a workpiece on a fixed frame and transporting the same using a skid are widely used. Also, a large workpiece is transported using a fork lift or an Automated Guided Vehicle (AGV).

Recently, with the diversification of products, multiple production lines are required for respective products, and production lines are being adapted for small-quantity batch-production. However, it is expensive to construct production lines for respective products, which may subject the operator of a plant to heavy losses if revenue is low. In this regard, Korean Patent Application Publication No. 10-2007-0055251, published on May 30, 2007 discloses a technology related to "Common assembly jig device for multi-link type rear axle assembly in vehicle."

SUMMARY OF THE INVENTION

An object of the present invention is to easily and efficiently rearrange and provide jigs and production workbenches for multiple models when mixed model production is performed in a factory.

Another object of the present invention is to reduce the amount of time and expense taken to change a production line so as to match the type of model to be produced.

A further object of the present invention is to reduce the unit cost of producing a product by reducing the expense of changing a production line and to thereby supply products at reasonable prices to consumers.

In order to accomplish the above objects, a method for controlling a variable production line according to the present invention includes organizing a process group that includes multiple variable workbenches based on a design of a product model; mounting each of the multiple variable workbenches on an upper part of a skid board formed with multiple skid rings; loading a skid board, corresponding to the process group, on a powered line that moves at a regular speed in a fixed direction, and moving the skid board in consideration of a position of a worker responsible for each process and a work state of the process group; and removing a skid board, on which a target variable workbench corresponding to an unload instruction in the process group is mounted, from the powered line when the unload instruction is input from a worker, and thereby stopping movement of the target variable workbench.

Here, a combination corresponding to the process group may be changed depending on a type of the product model.

Here, moving the skid board may be configured to move the skid board by turning the multiple skid rings using a gear of a chain corresponding to the powered line.

Here, stopping the movement may be configured to disconnect the skid board on which the target variable workbench is mounted from the gear of the chain.

Here, the method may further include connecting the skid board on which the target variable workbench is mounted with the gear of the chain when a load instruction is input from the worker after work at the target variable workbench is completed in a state in which the target variable workbench is stationary.

Here, when the skid board is removed from the powered line, the skid board may move in a direction that is perpendicular to the direction in which the powered line is moving.

Here, the multiple variable workbenches may share a power source by being connected with each other in an attachable/detachable manner.

Here, organizing the process group may include fixing multiple parts for producing the product model to variable jigs, each of which is installed in each of the multiple variable workbenches; and determining an order in which the multiple variable workbenches are to be connected based on an order in which the parts are to be assembled, which is written in the design, and combining the multiple variable workbenches in the determined order.

Here, the variable jig may include multiple support pins for forming a jig shape that matches a shape of each of the multiple parts and a variable jig plate having multiple pin holes through which the multiple support pins are capable of penetrating.

Here, the multiple variable workbenches may include at least one of a monitor, a speaker, a lamp and a vibration module in order to provide the worker with at least one of the work state of the process group and information about a current process.

Also, a skid-type variable workbench according to an embodiment of the present invention includes a variable jig including multiple support pins for forming a jig shape that matches a shape of a part and a variable jig plate having multiple pin holes through which the multiple support pins are capable of penetrating; a workbench including the variable jig located at a center of a lower part thereof and including at least one of a monitor, a speaker, a lamp and a vibration module for providing at least one of information about a current process of a worker and a work state of a process group for producing a product model; and a skid board, formed with multiple skid rings, for moving the workbench by mounting the workbench on an upper part thereof and by fastening a lower part thereof to a powered line that moves at a regular speed in a fixed direction.

Here, the multiple skid rings are turned by a gear of a chain corresponding to the powered line, whereby the skid-type variable workbench may move.

Here, when the worker inputs an unload instruction, the skid board may be disconnected from the gear of the chain, thereby being removed from the powered line.

Here, when the worker inputs a load instruction in a state in which the skid-type variable workbench is removed from the powered line, the skid board may be connected with the gear of the chain.

Here, when the skid board is removed from the powered line, the skid board may move in a direction that is perpendicular to the direction in which the powered line is moving.

Here, the workbench may share a power source with another skid-type variable workbench included in the process group by being connected therewith in an attachable/detachable manner.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
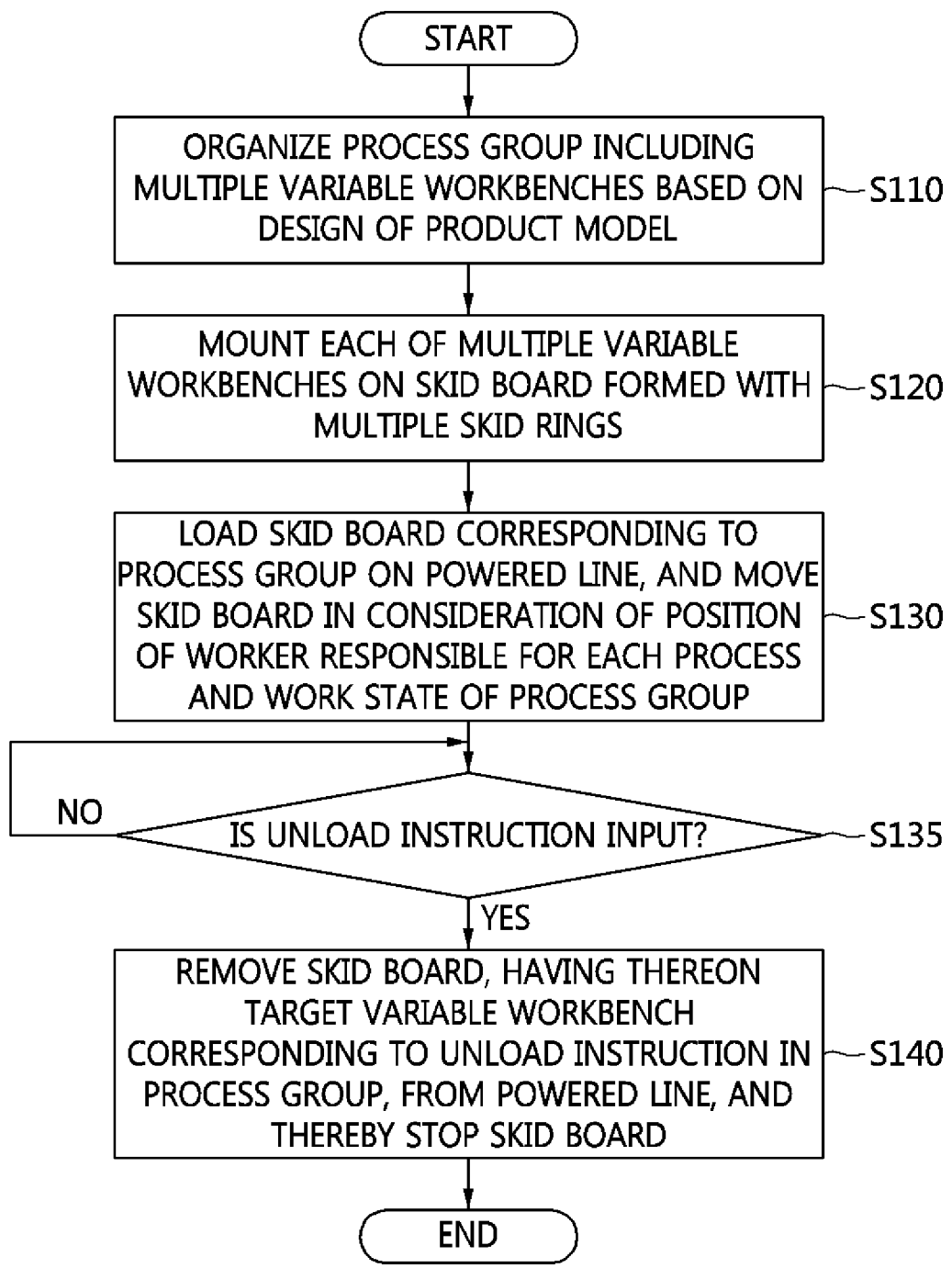
FIG. 1 is a flowchart that shows a method for controlling a variable production line according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a flowchart that shows a method for controlling a variable production line according to an embodiment of the present invention.

Referring to FIG. 1, in the method for controlling a variable production line according to an embodiment of the present invention, a process group including multiple variable workbenches is organized based on the design of a product model at step S110.

Here, the process group may be a collection of variable workbenches that are necessary in order to produce a product model. For example, assuming that workbench A1, workbench A2, and workbench A3 are necessary in order to produce a product corresponding to model A, the process group for model A may include the above three variable workbenches.

Here, the multiple variable workbenches included in the process group may be included in the state in which they are combined in consideration of a process sequence based on the design. For example, assuming that it is necessary to work at workbench B1, at workbench B3, and at workbench B2 in sequence in order to produce model B, the workbenches B1, B3 and B2 are connected in the order in which they are listed, and are then included in the process group for model B.

Here, a combination corresponding to a process group may change depending on the product model. That is, because process groups are organized for respective products, products may be produced without additional time or expense even when mixed model production is performed in a factory.

Here, the multiple variable workbenches may share a power source therebetween by being connected with each other in an attachable/detachable manner.

Here, a variable workbench according to an embodiment of the present invention may be basically configured with a workbench frame, a variable jig, a control device for modifying the variable jig, a main processing device, a wired/wireless communication device, a power supply device, and the like. Here, the workbench frame may be made of aluminum or iron, and may be freely shaped rather than being limited to a specific shape. Here, the main processing device may send and receive information to and from a Manufacturing Engineering System (MES) in a factory through the wired/wireless communication device. For example, the main processing device may manage a production plan and production information while sending and receiving, to and from the MES, at least one of information about a product model to be produced, the current position of the variable workbench, whether the workbench is to be changed upon the change of a product model, and information about a worker. Here, the wired/wireless communication device may include any available communication method, such as RS-485, RS-232, Modbus, OPC, OPC-UA, Ethernet, Wi-Fi, Bluetooth, RFID, ZigBee, Smart Utility Network (SUN) and the like.

Here, power may be supplied to a variable workbench using the power supply device. Also, multiple variable workbenches connected with each other may operate by sharing power supplied from the power supply device.

Figure 4:
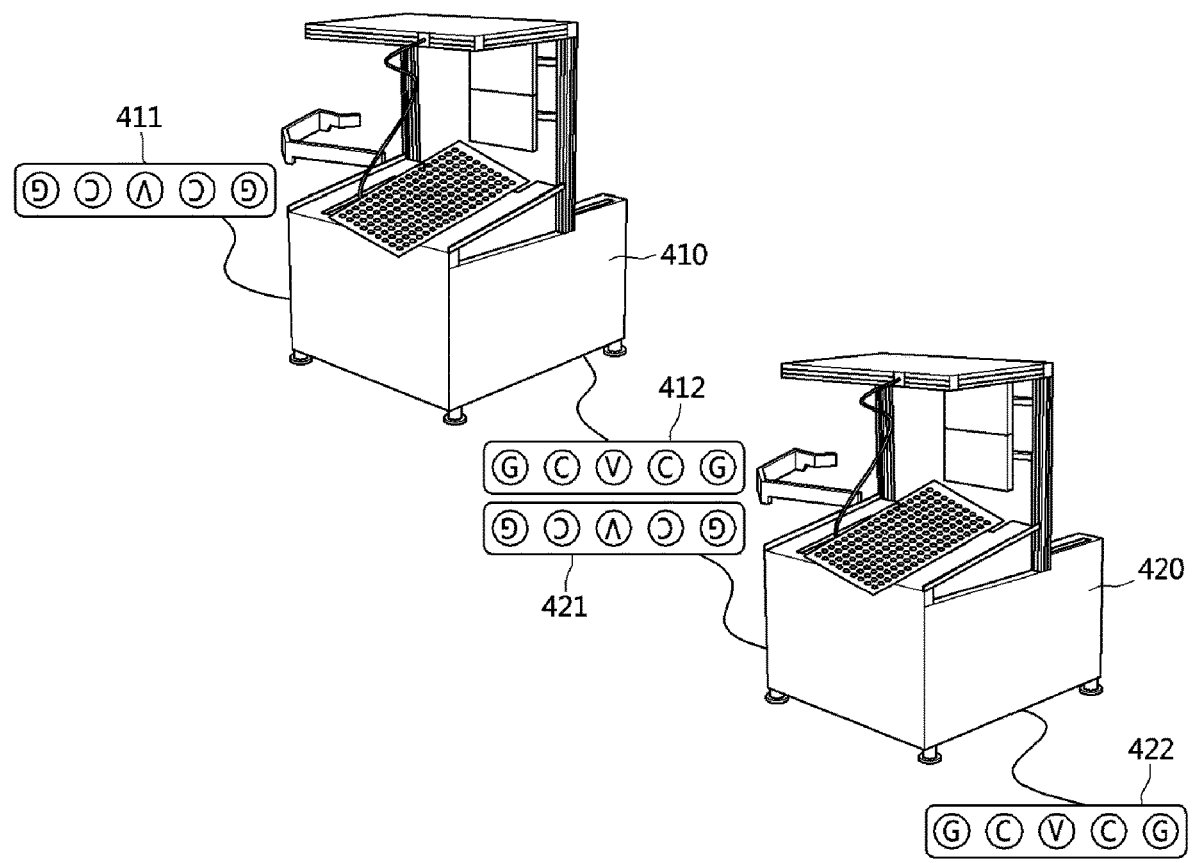
FIG. 4 is a view that shows an example of a structure in which the variable workbench illustrated in FIG. 3 is connected with another variable workbench.

For example, as illustrated in FIG. 4, a variable workbench 410 according to an embodiment of the present invention may have magnetic detachable cables 411 and 412 in order to connect itself with other variable workbenches located on both sides thereof. That is, when the variable workbench 410 is placed close to another variable workbench 420 having cables 421 and 422, the cable 412 is automatically connected with the cable 421 due to magnetic force, whereby a power source may be shared. Conversely, when a worker pulls any one of multiple variable workbenches that are connected with each other, the connection of cables is automatically broken, whereby the supply of power may be interrupted.

Here, as shown in FIG. 4, a cable or a connector for connecting multiple variable workbenches may not have directionality because it has a bilaterally symmetrical form. Also, due to magnetic force, the cable or the connector may be connected even when it is overturned.

Here, each of multiple parts that are necessary in order to produce a product model may be fixed in a variable jig installed in each of the multiple variable workbenches.

Here, the variable jig may be a variable module that is capable of providing a jig having a shape suitable for the shape of a part to be fixed thereto. That is, although a single variable workbench is used, because a variable jig is installed therein, different parts may be fixed thereto depending on the circumstances.

Here, the variable jig may include multiple support pins for forming a jig shape that matches the shape of each of multiple parts and a variable jig plate having multiple pin holes through which the multiple support pins may penetrate.

Here, the variable jig may be located at the center of the lower part of a variable workbench.

Here, the multiple support pins move up and down so as to match the shape of a part, whereby the part may be stably fixed. When the part is not fixed, the multiple support pins may be located below the variable jig plate.

Here, each of the multiple variable workbenches may receive information about multiple parts based on the design of a product model, and may automatically change the shape of the variable jig thereof based on information about a part assigned thereto.

For example, when a work process for the left front door of a car is performed in a door trim production line in a car factory, the inner surface or the outer surface of the door may be processed. In this case, the multiple support pins may automatically move to make a shape so as to match the product model and the position suitable for the process.

Here, the order in which the multiple variable workbenches are to be connected is determined based on the assembly order of parts, which is written in the design. For example, after parts fixed to the variable jigs of the multiple variable workbenches are checked, the order in which the multiple variable workbenches are to be connected may be determined depending on the order in which the parts are to be assembled.

Here, the multiple variable workbenches may include at least one of a monitor, a speaker, a lamp and a vibration module in order to provide a worker with at least one of the work state of the process group and information about the current process.

Figure 3:
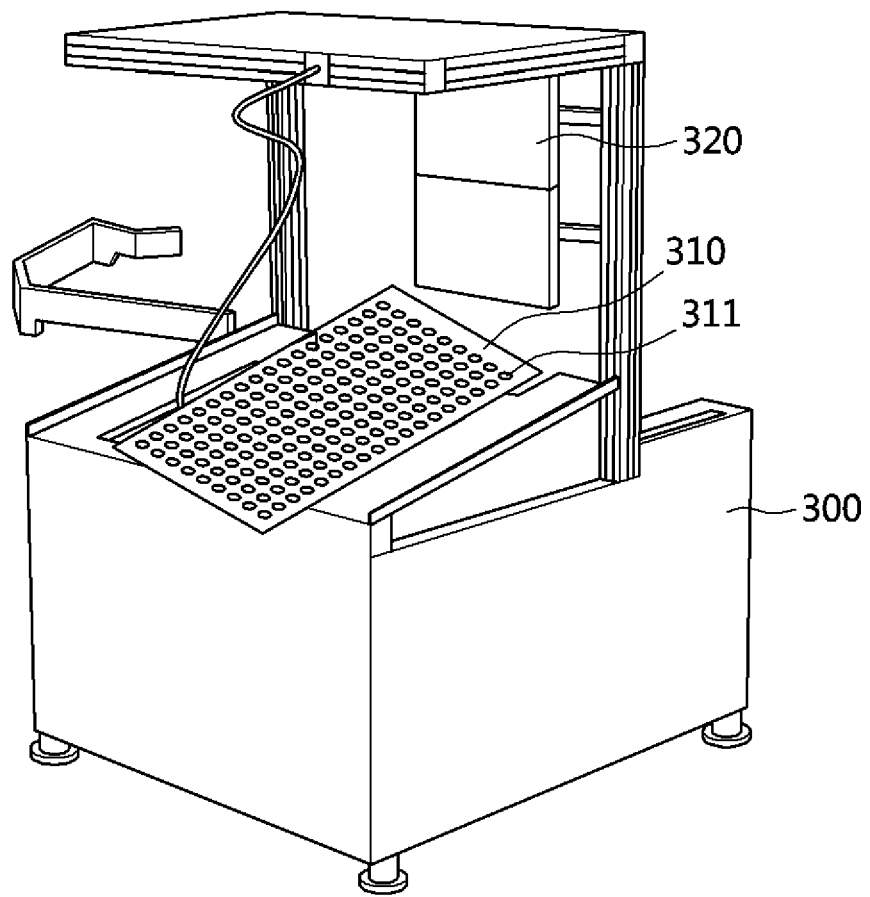
FIG. 3 is a view that shows an example of a variable workbench according to the present invention.

Referring to FIG. 3, the variable workbench 300 according to an embodiment of the present invention may include a variable jig plate 310 of a variable jig, which includes pin holes 311 through which support pins may penetrate, and a monitor 320, which displays a work state and information about work. Here, although not illustrated in FIG. 3, in addition to the monitor 320, a speaker, a lamp or a vibration module may be installed in the variable workbench 300 in order to provide convenience when a worker performs a process.

Also, each of the multiple variable workbenches may include various tools that are necessary for a process. For example, each of the multiple variable workbenches may include customized tools necessary for the processes performed by a worker, a barcode reader, a barcode printer, a rubber hammer, a drill, a power tool, a sealer, and the like.

Also, in the method for controlling a variable production line according to the present invention, each of the multiple variable workbenches is mounted on the upper part of a skid board that is formed with multiple skid rings at step S120.

Figure 5:
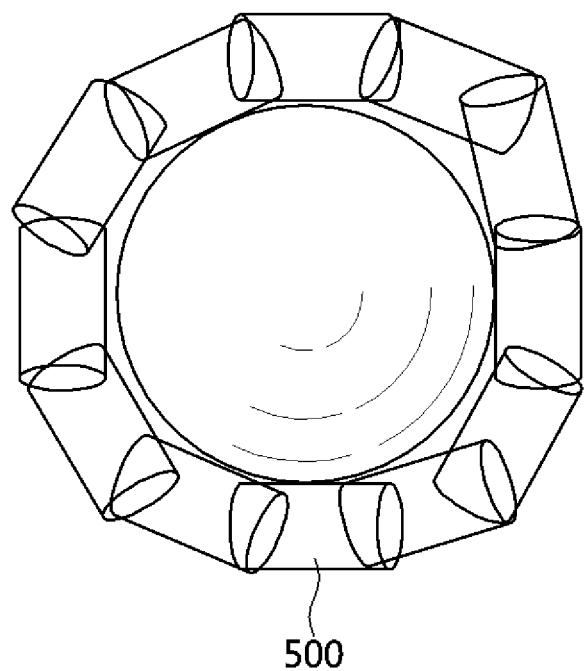
FIGS. 5 to 7 are views that show examples of a skid ring, a skid surface and a skid board formed with multiple skid rings according to the present invention.

Here, as illustrated in FIG. 5, a single skid ring may be formed in such a way that cylindrical parts are connected with each other so as to form a circular ring. Also, a ball-type bearing is placed inside the single skid ring as shown in FIG. 5 in order to help the skid move in an upward, downward, leftward, rightward, rearward or frontward direction.

Figure 6:
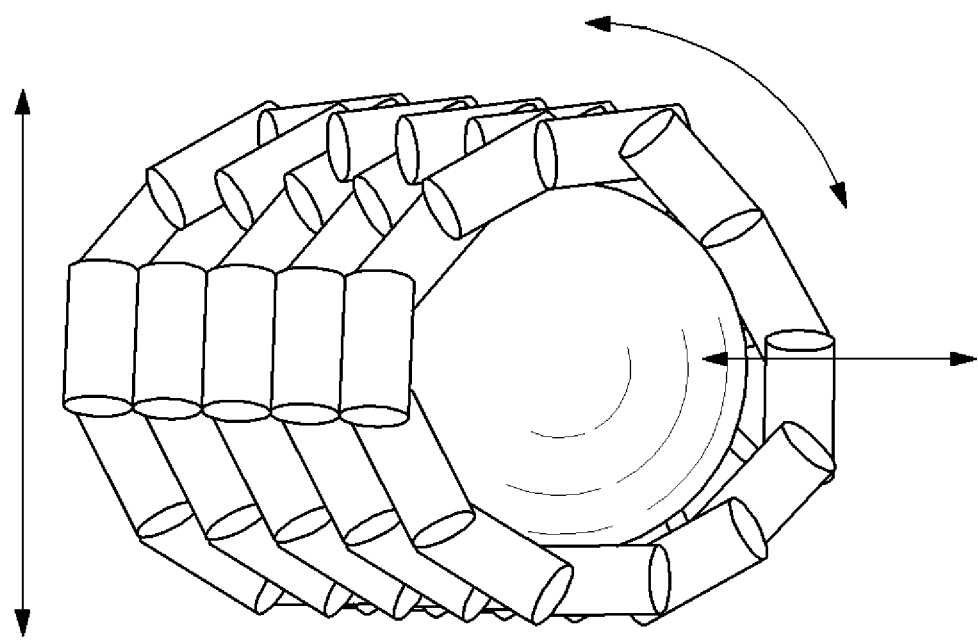
Figure 7:
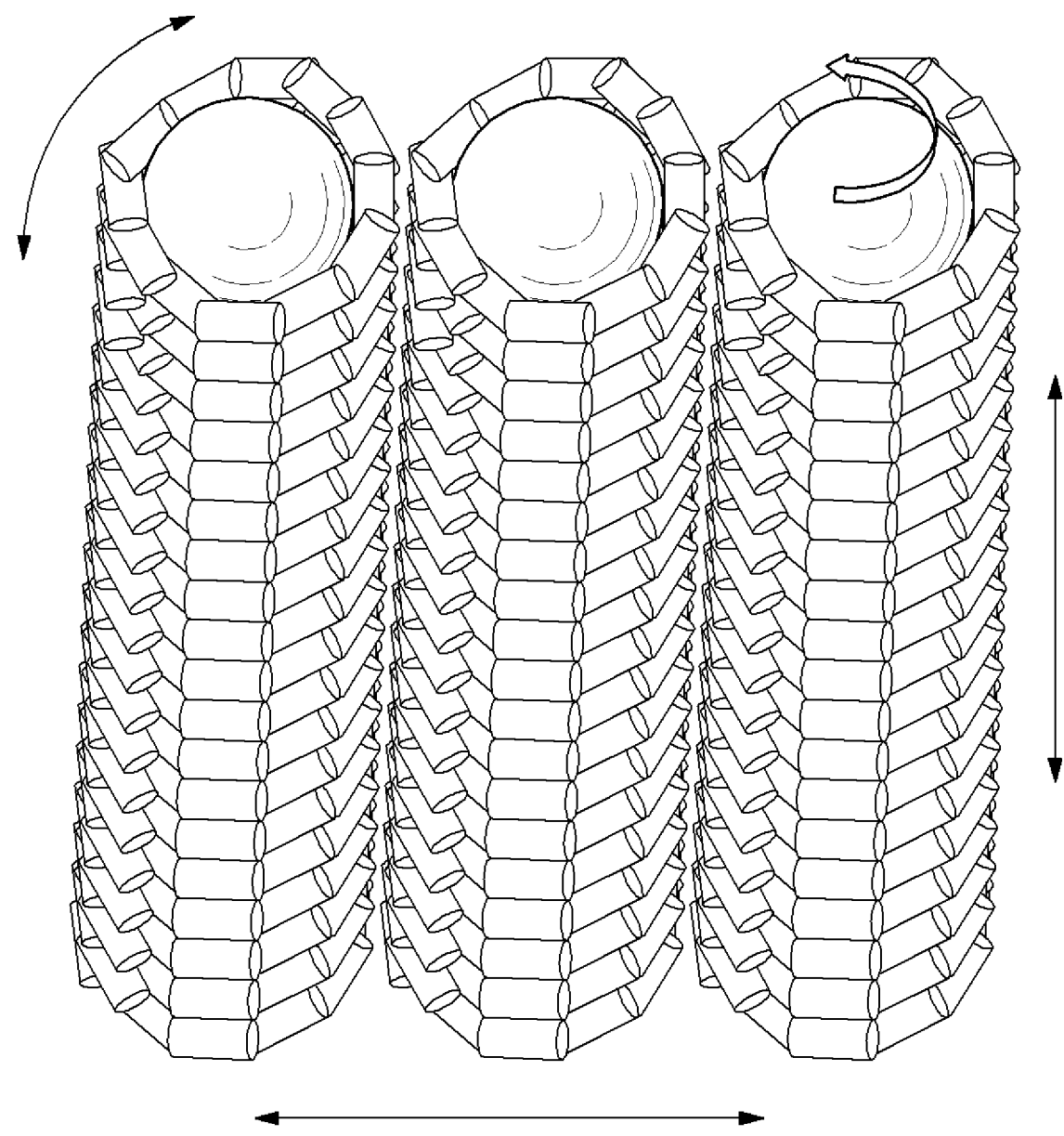

Multiple skid rings are combined so as to form a skid surface as shown in FIG. 6, and multiple skid surfaces may be combined so as to form a skid board as shown in FIG. 7.

Here, the skid board may move from side to side when a skid ring turns, and the skid board may move back and forth when a skid surface turns.

Here, the skid board may be designed in consideration of movement because it must move along a production line, and may use external power when moving along the production line.

Also, in the method for controlling a variable production line according to an embodiment of the present invention, a skid board corresponding to the process group is loaded on a powered line that is moving at a regular speed in a fixed direction, and the skid board is moved in consideration of the position of a worker responsible for the process and the work state of the process group at step S130.

Here, the powered line may be placed on the floor of the line for the process, and may be formed as a chain and operated using a gear. Also, the powered line may be designed so as to keep moving at a regular speed in a fixed direction.

Here, the process to be performed next is checked in consideration of the work state of the process group, the position of a worker who will perform the next process is checked based on the positions of workers responsible for respective processes, and the skid board may be moved to the corresponding position.

Here, the skid board may be moved by turning multiple skid rings using the gear of the chain corresponding to the powered line.

Figure 9:
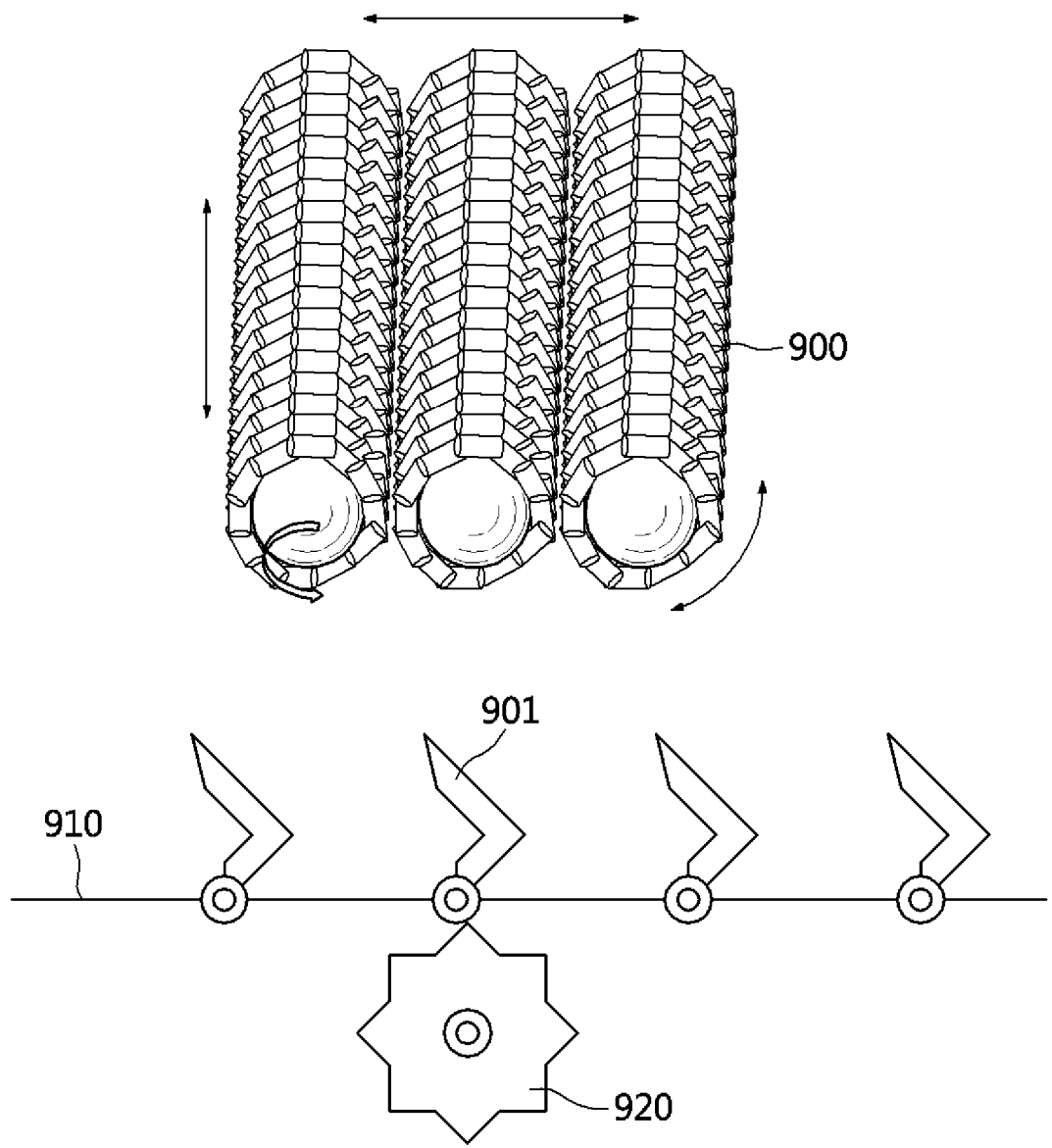
FIGS. 9 to 10 are views that show an example of a structure in which a skid board according to the present invention is loaded on a powered line or unloaded therefrom.

For example, FIG. 9 shows that the skid board 900 according to the present invention is moved by the gear 920 of the chain 901 corresponding to the powered line 910.

Here, the chain 901, connected with the lower part of the skid board 900, may turn the multiple skid rings, whereby the skid board may move laterally.

Also, in the method for controlling a variable production line according to an embodiment of the present invention, when a worker inputs an unload instruction, the skid board, on which a target variable workbench corresponding to the unload instruction in the process group is mounted, is removed from the powered line, whereby the movement of the target variable workbench is stopped at step S140.

Here, the worker may input an instruction for unloading a skid board using a separate control device connected to the production line along which the skid board is moving.

For example, the control device may include a display panel through which a worker may check the positions of the skid boards that are moving in the production line, the work state of the process group, and the like, and the worker may input a control instruction using the display panel in order to unload a skid board corresponding to the process to perform.

In another example, after a worker inputs an unload instruction so that the skid board arriving at his or her position is removed from the powered line, the worker may move the removed skid board to his or her workspace by pulling the same.

Here, the skid board on which the target variable workbench is mounted may be disconnected from the gear of the chain.

Figure 10:
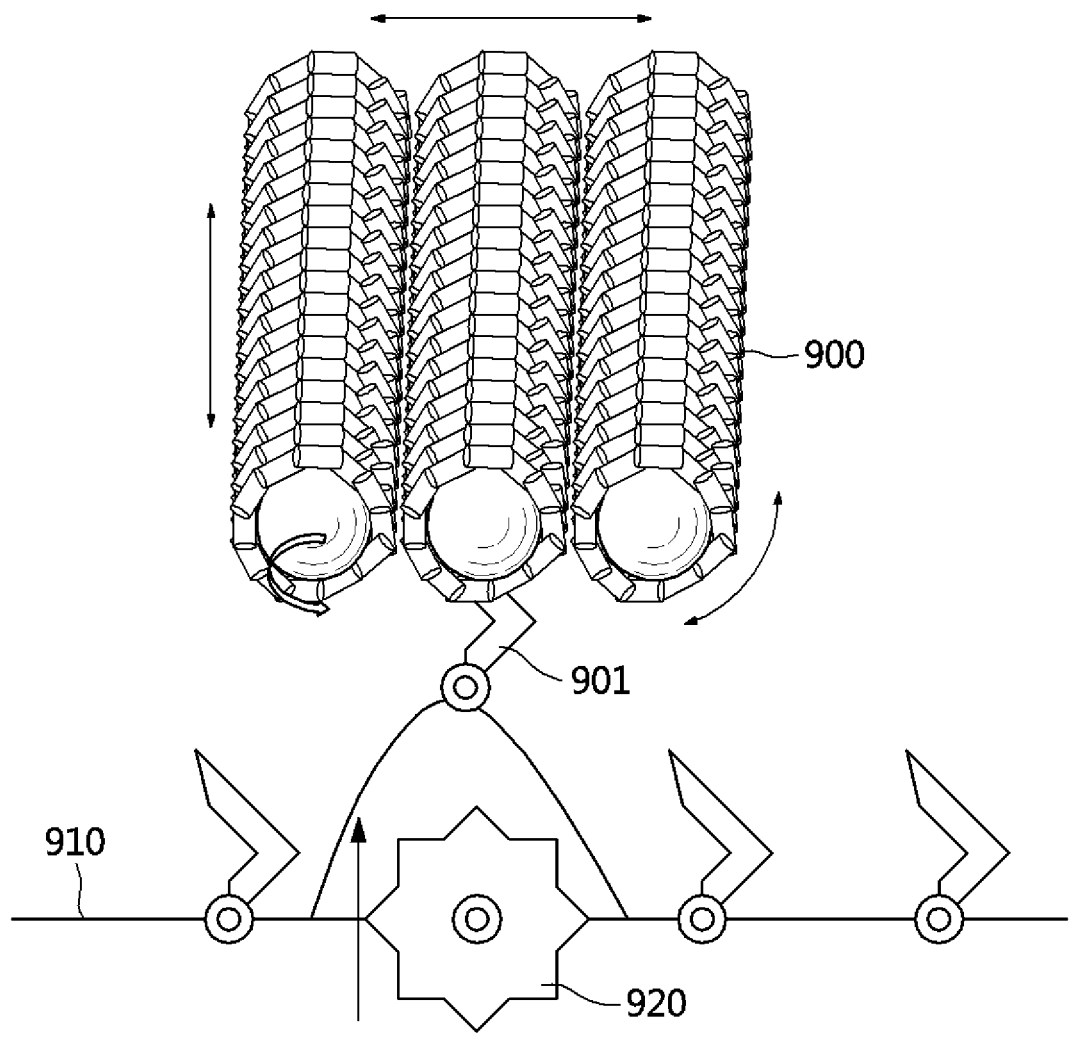

For example, FIG. 10 shows that the skid board 900 according to the present invention is disconnected from the gear 920 of the powered line 910. Here, a chain piece 901 connected to the skid board 900 is disconnected from the gear 920 of the powered line 910 along with the skid board 900, whereby the rotation of the multiple skid rings is stopped, and the movement of the skid board may be stopped.

Also, although not illustrated in FIG. 1, in the method for controlling a variable production line according to an embodiment of the present invention, after the target variable workbench stops and work at the target variable workbench is completed, when a worker inputs a load instruction, the skid board on which the target variable workbench is mounted may be connected to the gear of the chain corresponding to the powered line.

That is, referring to FIG. 10, when a worker inputs a load instruction, the skid board 900 and the chain piece 901 are again connected with the gear 920 of the powered line 910, whereby the skid board 900 may move.

Here, when the skid board is removed from the powered line, the skid board may move in a direction that is perpendicular to the direction in which the powered line is moving.

For example, when the skid board 900 is moving laterally along the powered line 910 as shown in FIG. 9, a worker may unload the skid board 900 in order to perform a process at the variable workbench mounted thereon. In this case, the skid board 900 may be removed from the powered line 910 as shown in FIG. 10, and the worker who removed the skid board 900 from the powered line 910 may move the skid board 900 to his or her workspace by pulling the same in the direction perpendicular to the direction in which the powered line 910 is moving.

As described above, when the method for controlling a variable production line is used, the spatial and temporal cost of reconfiguring a production line for mixed model production in a factory may be reduced.

Also, the unit cost of producing a product may be reduced by reducing the cost of changing a production line, whereby products may be supplied at reasonable prices to consumers.

Figure 2:
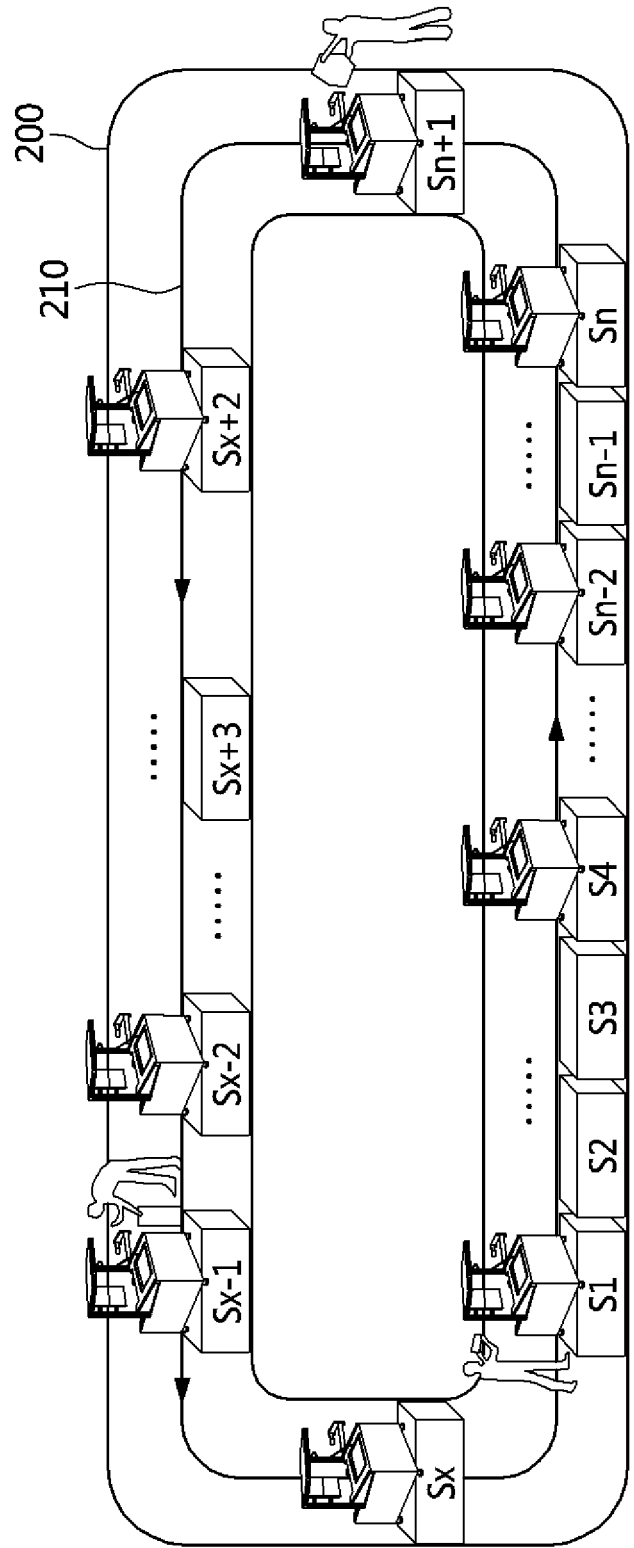
FIG. 2 is a view that shows an example of the configuration of a production line using a skid-type variable workbench according to the present invention.

FIG. 2 is a view that shows an example of the configuration of a production line using a skid-type variable workbench according to the present invention.

Referring to FIG. 2, a production line 200 configured using a skid-type variable workbench according to the present invention changes the existing method of using a conveyor belt to the method of using a modular skid for the flow of materials in a factory.

Here, modular skids, such as S1 to S4, Sx, and the like illustrated in FIG. 2, may correspond to the skid board, which was described with reference to FIG. 1, and may move laterally along the direction in which the powered line 210 is moving, or may freely move in the direction that is perpendicular to the direction in which the powered line 210 is moving.

Here, each of the modular skids illustrated in FIG. 2, that is, each skid board may be moved through the powered line 210 in the state in which a variable workbench according to an embodiment of the present invention is mounted thereon.

Accordingly, skid-type variable workbenches according to an embodiment of the present invention, each of which is a combination of a skid board and a variable workbench, are freely combined, whereby a new production line may be easily configured even when a product model is changed.

For example, assume that skid-type variable workbenches corresponding to S1, S2, S3 and S4 illustrated in FIG. 2 are necessary in order to produce a product of model A, and that skid-type variable workbenches corresponding to S1, Sn-2, S3, S4 and Sn illustrated in FIG. 2 are necessary in order to produce a product of model B. Here, the production line 200 may be requested to produce model A and model B. In this case, a process group for model A is organized, and model A may be produced first. Then, when the production of model A has been completed, the skid-type variable workbench corresponding to S2 is removed from the group, and skid-type variable workbenches corresponding to Sn-2 and Sn are newly arranged in the group, whereby a process group for producing model B may be reconfigured. Then, model B may be produced based on the reconfigured process group.

Also, a variable workbench is provided in the state in which it is mounted on a modular skid as shown in FIG. 2, whereby inconvenience in which workers have to lift a workpiece from a conveyor belt, fix the same to a jig frame, lift the workpiece again when processing of the workpiece is completed, and put the workpiece on the conveyor belt in order to transport the same may be resolved. Also, according to the present invention, because a workpiece is transported in the state in which it is fixed in a variable workbench, scratches or other forms of human error caused while transporting the workpiece may be avoided.

Figure 8:
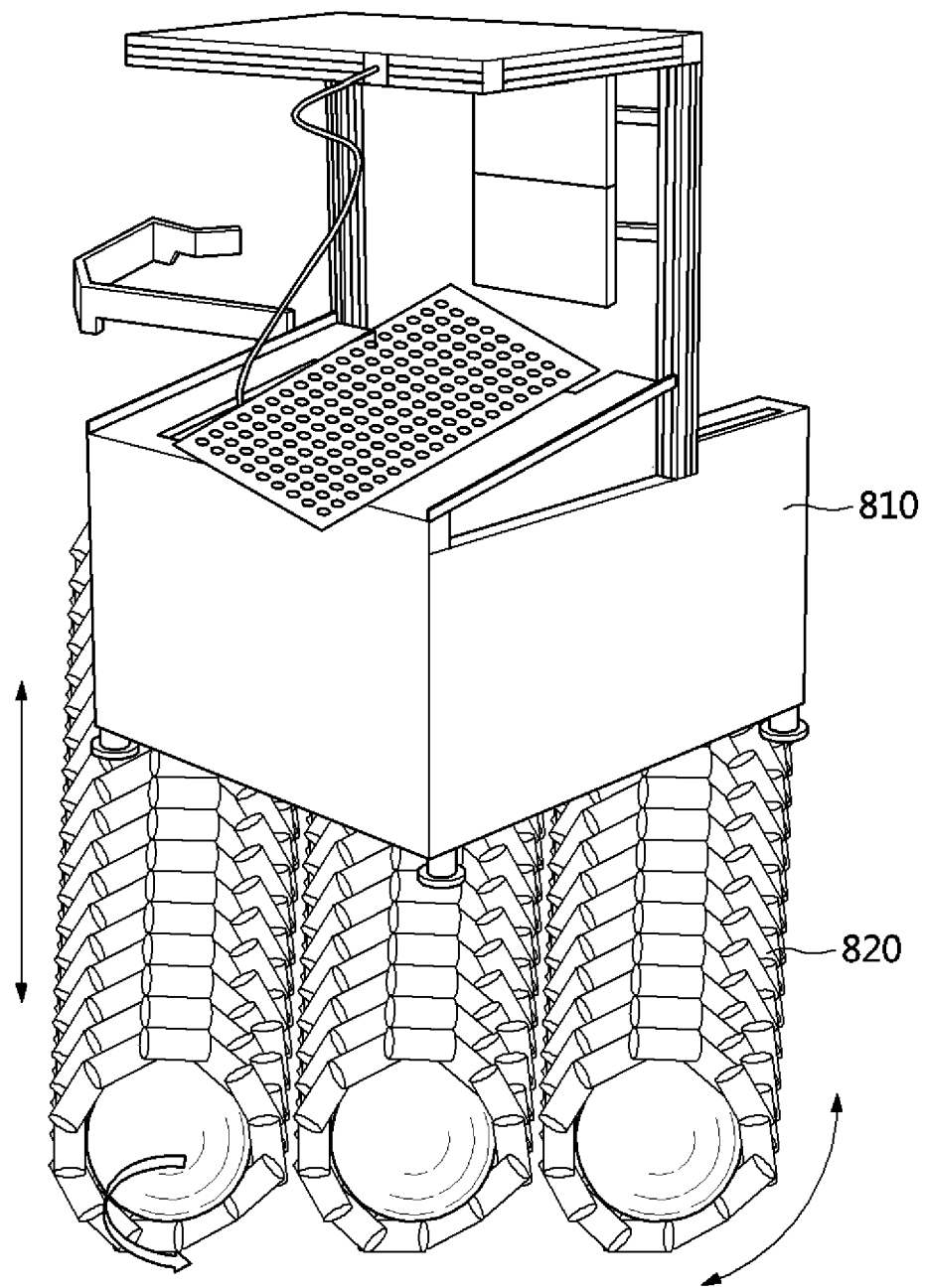
FIG. 8 is a view that shows an example of a skid-type variable workbench according to the present invention.

FIG. 8 is a view that shows an example of a skid-type variable workbench according to the present invention.

Referring to FIG. 8, a skid-type variable workbench according to the present invention may be formed in such a way that a variable workbench 810, which enables a worker to fix a product or a part thereto and to perform work therein, is mounted on a skid board 820, which moves along a powered line.

Here, although not illustrated in FIG. 8, the variable workbench 810 may include a variable jig, which includes multiple support pins for forming a jig shape that matches the shape of a part and a plate having multiple pin holes through which the multiple support pins may penetrate. Here, the variable jig may be located at the center of the lower part of the variable workbench 810.

Here, the multiple support pins move up and down so as to match the shape of a part, whereby the part may be stably fixed. When the part is not fixed, the multiple support pins may be located below the variable jig plate.

Here, the variable jig may be a variable module that is capable of providing a jig having a shape suitable for the shape of a part to be fixed thereto. Therefore, the variable workbench 810 in which the variable jig is installed may fix different parts depending on the product model.

Here, the variable workbench 810 may receive information about a part based on the design of a product model, and may automatically change the shape of the variable jig thereof based on information about a part assigned thereto.

For example, when a work process for the left front door of a car is performed in a door trim production line in a car factory, the inner surface or the outer surface of the door may be processed. In this case, the multiple support pins may automatically move to form a shape so as to match the product model and the position suitable for the process.

Also, the variable workbench 810 may include at least one of a monitor, a speaker, a lamp and a vibration module in order to provide at least one of a work state of the process group for producing a product model and information about the current process of a worker.

Also, the variable workbench 810 may include various tools that are necessary for a process. For example, the variable workbench 810 may include customized tools necessary for the processes performed by a worker, a barcode reader, a barcode printer, a rubber hammer, a drill, a power tool, a sealer, and the like.

The skid board 820 is formed with multiple skid rings, a variable workbench 810 is mounted on the upper part thereof, and the lower part thereof is fastened to a powered line that moves at a regular speed in a fixed direction, whereby the skid board 820 moves the variable workbench 810.

Here, the powered line may be placed on the floor of the line for a process, and may be formed as a chain and operated using a gear. Also, the powered line may be designed to keep moving at a regular speed in a fixed direction.

Here, the skid-type variable workbench illustrated in FIG. 8 may move when multiple skid rings are turned by the gear of the chain corresponding to the powered line.

For example, FIG. 9 shows that the skid board 900 according to the present invention moves using the gear 920 of the chain 901 corresponding to the powered line 910.

Here, the chain 901, connected with the lower part of the skid board 900, may turn the multiple skid rings, whereby the skid board may move laterally.

Here, when a worker inputs an unload instruction, the skid board 900 may be removed from the powered line by being disconnected from the gear of the chain.

For example, FIG. 10 shows that the skid board 900 according to the present invention is disconnected from the gear 920 of the powered line 910. Here, the chain piece 901 connected to the skid board 900 is disengaged from the gear 920 of the powered line 910 when the skid board 900 is removed from the powered line 910, whereby the rotation of the multiple skid rings is stopped, and the movement of the skid board may be stopped.

Here, a worker may input an instruction for unloading a skid board using a separate control device connected to the production line along which the skid board is moving.

For example, the control device may include a display panel through which a worker may check the positions of the skid boards that are moving in the production line, the work state of the process group, and the like, and the worker may input a control instruction using the display panel in order to unload a skid board corresponding to the process to perform.

In another example, after a worker inputs an unload instruction in order for the skid board arriving at his or her position to be removed from the powered line, the worker may move the removed skid board to his or her workspace by pulling the same.

Here, when a worker inputs a load instruction in the state in which the skid-type variable workbench is removed from the powered line, the skid board 820 illustrated in FIG. 8 may be connected with the gear of the chain.

That is, referring to FIG. 10, when a worker inputs a load instruction, the skid board 900 and the chain piece 901, which are removed from the powered line 910, may be connected again with the gear 920 of the powered line 910, whereby the skid board 900 may be moved.

Here, when the skid board 820 is removed from the powered line, it may be moved in the direction that is perpendicular to the direction in which the powered line is moving.

For example, when the skid board 900 is moving laterally along the powered line 910 as shown in FIG. 9, a worker may unload the skid board 900 in order to perform a process at the variable workbench mounted thereon. In this case, the skid board 900 may be removed from the powered line 910 as shown in FIG. 10, and the worker who removed the skid board 900 from the powered line 910 may move the skid board 900 to his or her workspace by pulling the same in the direction perpendicular to the direction in which the powered line 910 is moving.

Here, the variable workbench 810 according to an embodiment of the present invention may be basically configured with the variable jig, which was described above, a workbench frame, a control device for modifying the variable jig, a main processing device, a wired/wireless communication device, a power supply device, and the like. Here, the workbench frame may be made of aluminum or iron, and may be freely shaped rather than being limited to a specific shape. Here, the main processing device may send and receive information to and from a Manufacturing Engineering System (MES) in a factory through the wired/wireless communication device. For example, the main processing device may manage a production plan and production information while sending and receiving, to and from the MES, at least one of information about a product model to be produced, the current position of the variable workbench, whether the workbench is to be changed upon the change of a product model, and information about a worker. Here, the wired/wireless communication device may include any available communication method, such as RS-485, RS-232, Modbus, OPC, OPC-UA, Ethernet, Wi-Fi, Bluetooth, RFID, ZigBee, Smart Utility Network (SUN) and the like.

Here, the variable workbench 810 may share a power source with another variable workbench included in the process group by being connected therewith in an attachable/detachable manner.

For example, as illustrated in FIG. 4, a variable workbench 410 according to an embodiment of the present invention may have magnetic detachable cables 411 and 412 in order to connect itself with other variable workbenches located on both sides thereof. That is, when the variable workbench 410 is placed close to another variable workbench 420 having cables 421 and 422, the cable 412 is automatically connected with the cable 421 due to magnetic force, whereby a power source may be shared. Conversely, when a worker pulls any one of multiple variable workbenches that are connected with each other, the connection of cables is automatically broken, whereby the supply of power may be interrupted.

Here, as shown in FIG. 4, a cable or a connector for connecting multiple variable workbenches may not have directionality because it has a bilaterally symmetrical form. Also, due to magnetic force, the cable or the connector may be connected even when it is overturned.

Figure 11:
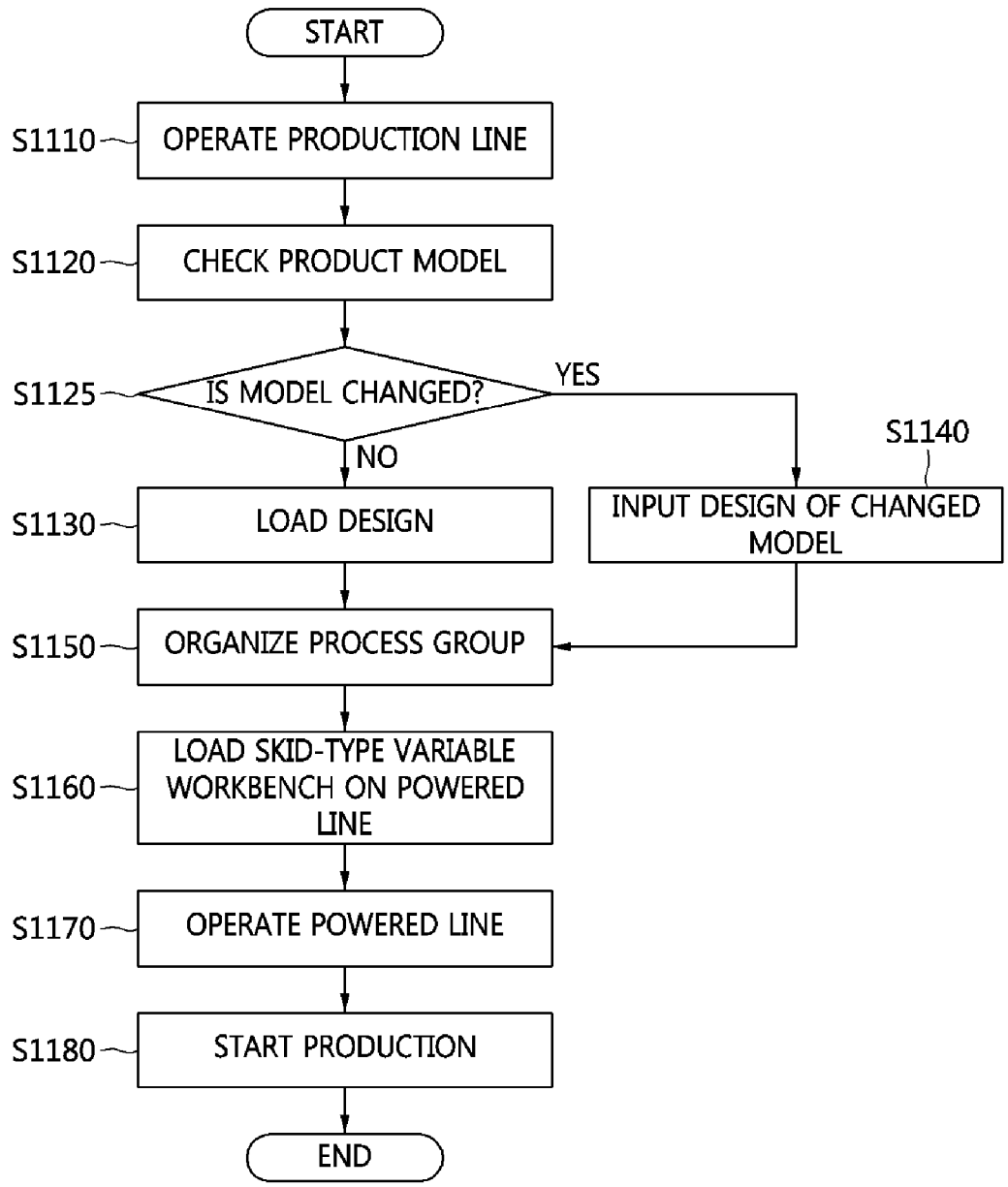
FIG. 11 is a flowchart that specifically shows the process of preparing for production based on a method for controlling a variable production line according to an embodiment of the present invention.

FIG. 11 is a flowchart that specifically shows the process of preparing for production based on the method for controlling a variable production line according to an embodiment of the present invention.

Referring to FIG. 11, in the process of preparing for production based on the method for controlling a variable production line according to an embodiment of the present invention, first, a production line is operated at step S1110 by supplying power thereto in a factory.

Then, a product model to be produced through the production line is checked at step S1120, and whether the product model is changed may be determined at step S1125 based on a design that is currently set.

When it is determined at step S1125 that the product model is not changed, the set design is loaded and used at step S1130.

Conversely, when it is determined at step S1125 that the product model is changed, the design of the changed product model may be input to the system of the production line at step S1130.

Then, based on the input design, a process group may be organized using variable workbenches according to an embodiment of the present invention at step S1150.

Then, the skid-type variable workbench corresponding to the process group is loaded on a powered line at step S1160, and the powered line is operated at step S1170, whereby the production of the product model may start at step S1180.

Figure 12:
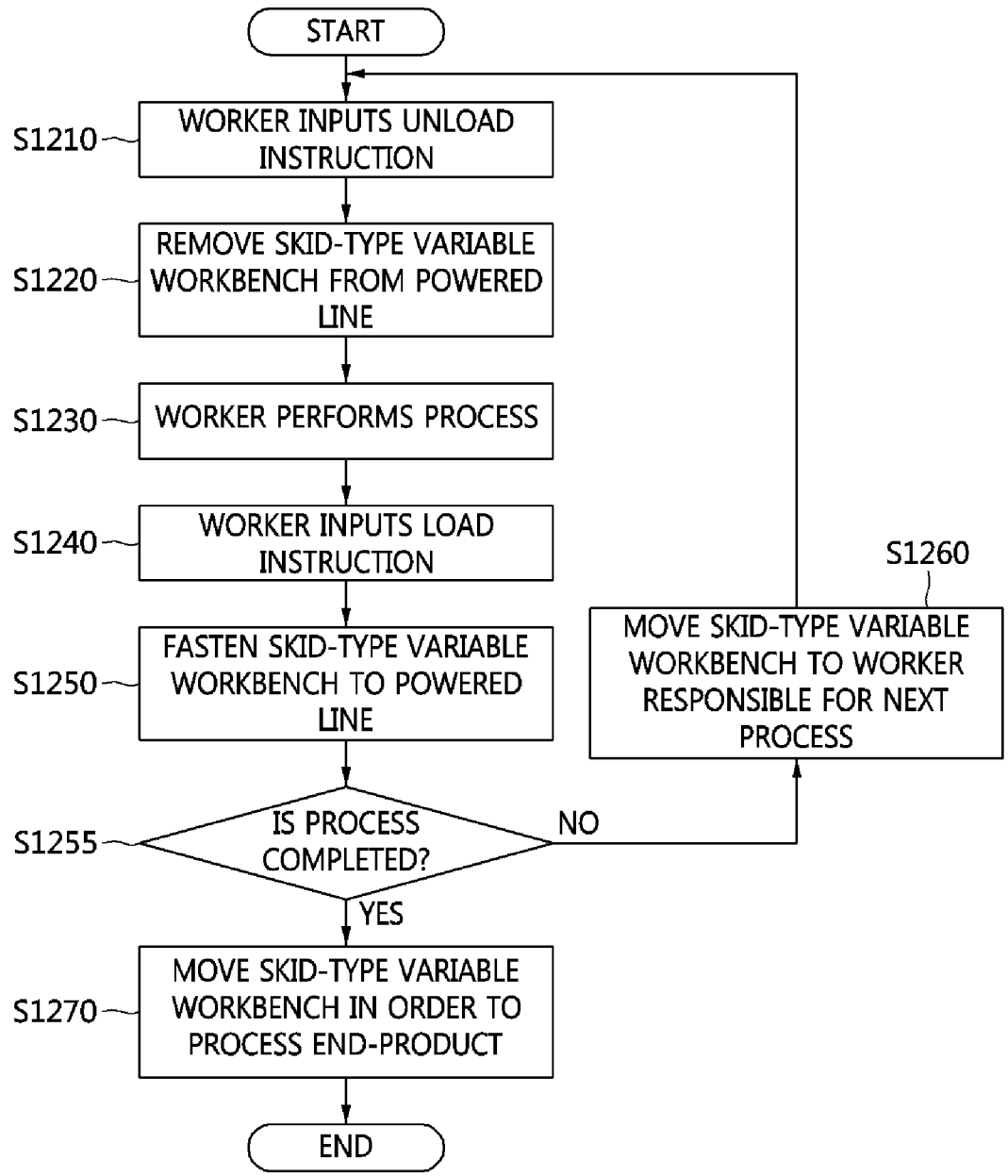
FIG. 12 is a flowchart that specifically shows the process of controlling a skid-type variable workbench according to a control instruction from a worker according to an embodiment of the present invention.

FIG. 12 is a flowchart that specifically shows the process of controlling a skid-type variable workbench according to a control instruction from a worker according to an embodiment of the present invention.

Referring to FIG. 12, in the process of controlling a skid-type variable workbench according to a control instruction from a worker according to an embodiment of the present invention, the worker may input an instruction for unloading a moving skid-type variable workbench at step S1210.

Then, the skid-type variable workbench is removed from a powered line at step S1220 in response to the unload instruction, and the worker may move the same to a workspace in order to perform a process therein.

Then, the worker may perform the process at the variable workbench mounted on the skid board at step S1230.

Then, when the worker inputs an instruction for loading the skid-type variable workbench at step S1240 after completing the process, the skid-type variable workbench may be loaded on the powered line again at step S1250.

Then, whether processes that require the skid-type variable workbench are completed is determined at step S1225, and when it is determined that processes are not completed, the skid-type variable workbench may be moved to the worker who is responsible for the next process at step S1260.

Also, when it is determined at step S1225 that the processes are completed, the skid-type variable workbench may be moved to space in which the end product is to be handled at step S1270 in order to handle the end product.

According to the present invention, when mixed model production is performed in a factory, jigs and production workbenches for multiple models may be easily and efficiently rearranged and provided.

Also, the present invention may reduce the amount of time and expense taken to change a production line so as to match the type of model to be produced.

Also, the present invention may reduce the unit cost of producing a product by reducing the expense of changing a production line, and may thereby supply products at reasonable prices to consumers.

As described above, the method and apparatus for controlling a variable production line using a skid-type variable workbench according to the present invention are not limitedly applied to the configurations and operations of the above-described embodiments, but all or some of the embodiments may be selectively combined and configured, so that the embodiments may be modified in various ways.

What is claimed is:

1. A method for controlling a variable production line, comprising:
   organizing a process group that includes multiple variable workbenches based on a design of a product model;
   mounting each of the multiple variable workbenches on an upper part of a skid board formed with multiple skid rings;
   loading a skid board, corresponding to the process group, on a powered line that moves at a regular speed in a fixed direction, and moving the skid board in consideration of a position of a worker responsible for each process and a work state of the process group; and
   removing a skid board, on which a target variable workbench corresponding to an unload instruction in the process group is mounted, from the powered line when the unload instruction is input from a worker, and thereby stopping movement of the target variable workbench.

2. The method of claim 1, wherein a combination corresponding to the process group is changed depending on a type of the product model.

3. The method of claim 1, wherein moving the skid board is configured to move the skid board by turning the multiple skid rings using a gear of a chain corresponding to the powered line.

4. The method of claim 3, wherein stopping the movement is configured to disconnect the skid board on which the target variable workbench is mounted from the gear of the chain.

5. The method of claim 4, further comprising:
   connecting the skid board on which the target variable workbench is mounted with the gear of the chain when a load instruction is input from the worker after work at the target variable workbench is completed in a state in which the target variable workbench is stationary.

6. The method of claim 1, wherein, when the skid board is removed from the powered line, the skid board is capable of moving in a direction that is perpendicular to the direction in which the powered line is moving.

7. The method of claim 1, wherein the multiple variable workbenches share a power source by being connected with each other in an attachable/detachable manner.

8. The method of claim 1, wherein organizing the process group comprises:
   fixing multiple parts for producing the product model to variable jigs, each of which is installed in each of the multiple variable workbenches; and
   determining an order in which the multiple variable workbenches are to be connected based on an order in which the parts are to be assembled, which is written in the design, and combining the multiple variable workbenches in the determined order.

9. The method of claim 8, wherein the variable jig includes multiple support pins for forming a jig shape that matches a shape of each of the multiple parts and a variable jig plate having multiple pin holes through which the multiple support pins are capable of penetrating.

10. The method of claim 1, wherein the multiple variable workbenches include at least one of a monitor, a speaker, a lamp and a vibration module in order to provide the worker with at least one of the work state of the process group and information about a current process.

11. A skid-type variable workbench, comprising:
a variable jig including multiple support pins for forming a jig shape that matches a shape of a part and a variable jig plate having multiple pin holes through which the multiple support pins are capable of penetrating;
a workbench including the variable jig located at a center of a lower part thereof and including at least one of a monitor, a speaker, a lamp and a vibration module for providing at least one of information about a current process of a worker and a work state of a process group for producing a product model; and
a skid board, formed with multiple skid rings, for moving the workbench by mounting the workbench on an upper part thereof and by fastening a lower part thereof to a powered line that is moves at a regular speed in a fixed direction.

12. The skid-type variable workbench of claim 11, wherein the multiple skid rings are turned by a gear of a chain corresponding to the powered line, whereby the skid-type variable workbench moves.

13. The skid-type variable workbench of claim 12, wherein, when the worker inputs an unload instruction, the skid board is disconnected from the gear of the chain, thereby being removed from the powered line.

14. The skid-type variable workbench of claim 13, wherein, when the worker inputs a load instruction in a state in which the skid-type variable workbench is removed from the powered line, the skid board is connected with the gear of the chain.

15. The skid-type variable workbench of claim 13, wherein, when the skid board is removed from the powered line, the skid board is capable of moving in a direction that is perpendicular to the direction in which the powered line is moving.

16. The skid-type variable workbench of claim 11, wherein the workbench shares a power source with another skid-type variable workbench included in the process group by being connected therewith in an attachable/detachable manner.

* * * * *